3,377,134
SODIUM METASILICATE PENTAHYDRATE PRODUCT AND PREPARATION

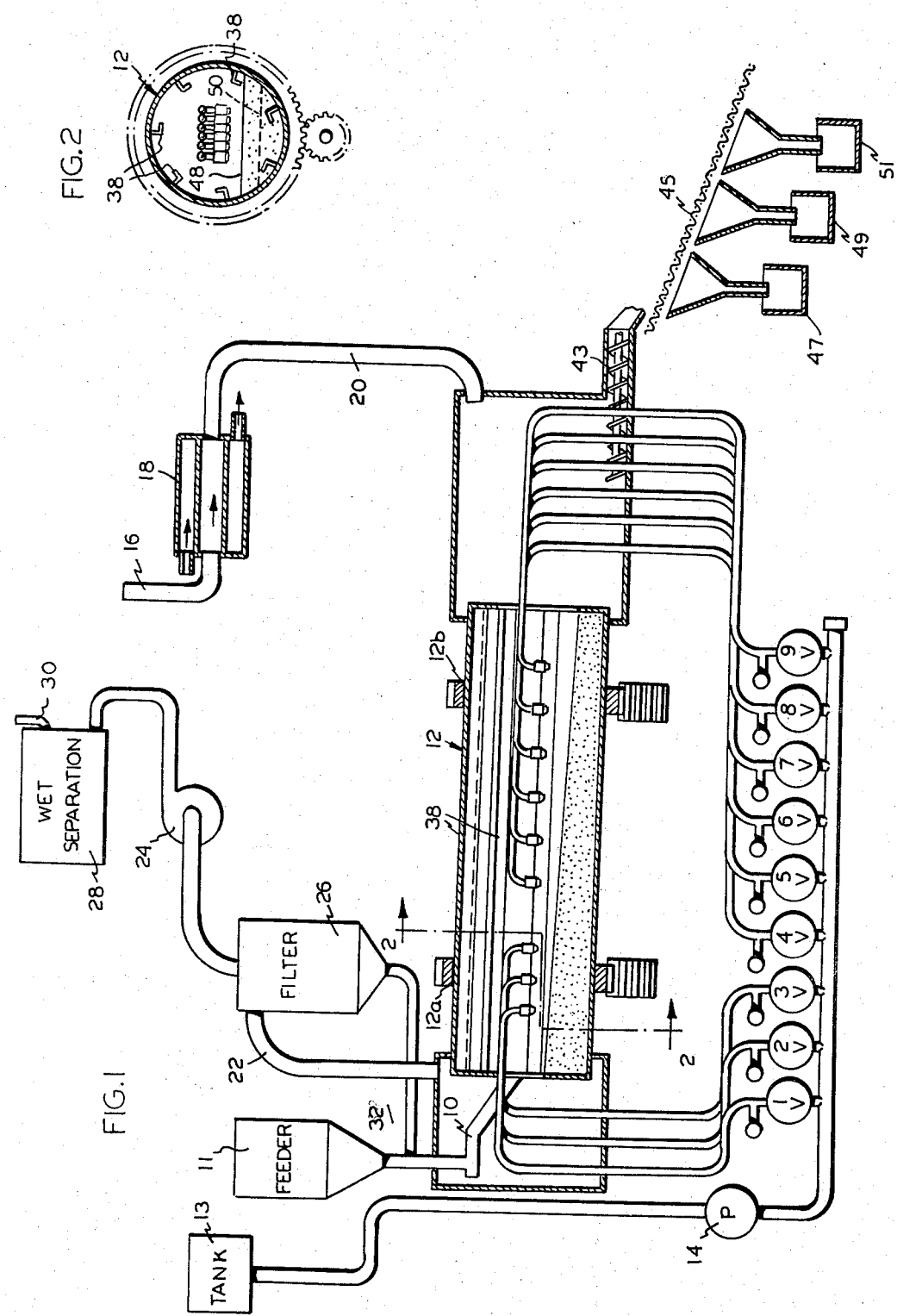

Chester L. Baker, Narberth, and Paul W. Holloway, Wayne, Pa., assignors to Philadelphia Quartz Company, Philadelphia, Pa., a corporation of Pennsylvania
Continuation-in-part of application Ser. No. 194,830, May 15, 1962. This application Sept. 19, 1966, Ser. No. 580,178
4 Claims. (Cl. 23—110)

ABSTRACT OF THE DISCLOSURE

A sodium metasilicate pentahydrate is formed using a high ratio of crystal surface to added liquor for rapid crystallization and the development of smooth, dust-free spherical particles with a dead-white appearance, low attrition loss and reduced tendency to cake.

Introduction

This application is a continuation-in-part of application Ser. No. 194,830 filed May 15, 1962, now abandoned, which in turn is a continuation-in-part of application Ser. No. 132,279 filed Aug. 16, 1961, now U.S. Patent No. 3,208,822 issued on Sept. 28, 1965, which in turn is a continuation-in-part of application Ser. No. 51,436 filed Aug. 23, 1960, now abandoned.

This invention generally relates to a novel crystallization process for the preparation of hydrates of sodium metasilicate. In this unique process, a thin layer of concentrated sodium metasilicate pentahydrate liquor, for example, covers the crystallized surface of the nuclei of sodium metasilicate pentahydrate so that the liquor is thoroughly seeded and has a high ratio of crystal surface to added liquid and crystallization can proceed rapidly at myriad points. In this process the temperature is controlled very carefully by balancing the heat of evaporation of excess water with the heat of crystallization of the hydrate and both the heat and moisture transfer occur directly between the gas phase and the coating of liquor on the seed particles. Thus the crystals of sodium metasilicate hydrate form rapidly in the thin surface layer and the layer becomes completely crystallized. The resulting product is a round particle having a dead-white appearance caused by the complete crystallization of very fine crystals, extremely regular in density and size, dust-free, and with a relatively high oil absorption and a relatively low attrition loss, and a rapid solution rate with little or no tendency to cake since the product has no sharp angular corners and is free from dust caused by grinding or attrition.

Present state of the art

The usual present commercial process for the manufacture of crystallized hydrates, such as the hydrates of sodium metasilicate, is to first prepare a liquor having substantially the same composition desired in the final product. This liquor is then mixed with a pulverized "seed" material and then allowed to crystallize to a solid mass under suitable conditions. Such a mixture can be spread on the exterior of a drum and stripped off as the dry crystallized product, and then crushed and ground as required. Alternatively, the blended mass can be run out as a thin layer on a sheet of metal, and the sheet of metal then cooled by water having a controlled temperature. Another widely used process is the introduction of large masses of the blended product into molds, which molds are then allowed to cool slowly under ambient conditions permitting a complete crystallization throughout the mass by the slow loss of the heat of crystallization through the mass itself, and finally through the sides of the molds. This product must then be ground and sieved which results in the problem of fine dusts attached electrostatically to the surfaces of large particles. The particle surfaces become relatively dull when coated with fine dust and have a gray appearance because of the transmitted light through the relatively large crystals which protrude from the particle surface making the particles sharp and angular when produced by grinding the large mass. Even when finer particles are aggregated into the size desired by commerce, using the known processes of adding water, silicate solution or silicate melt as a binder, they still have sharp angles and remain translucent, dull and gray.

At one time crystals of sodium metasilicate pentahydrate were grown from mother liquor and separated therefrom. This produced discrete crystals. The remaining mother liquor, coated on the surface of the crystals, crystallized homogeneously with the single crystal which was translucent and gray in color. These crystals are elongated and more or less flat. The crystallization of the mother liquor which remains on the crystals completes the crystal faces already formed and thus does not result in an opaque product. This is in direct contrast to our invention wherein sufficient liquor is applied to the surface of the crystals and the conditions are so controlled that a multiple number of crystallizations occurs to form a product which is round and opaque. The descrete crystals of metasilicate, which were manufactured up to about 1948, had a bulk density of about 42 lbs. per cubic foot and were relatively fine according to present standards since the specifications permitted 10% maximum on a 20 mesh screen and 15% maximum through a 65 mesh screen.

In general, a macroscopic crystal of pure sodium metasilicate pentahydrate is transparent. However, these are rarely seen since, unless the magma is completely crystallized, the crystals are translucent and tend to have a gray cast. In the presence of impurities, the color may vary and be yellow.

Almost instantaneous crystallization may be obtained by the thorough blending in of a great number of finely divided seed crystals providing a high ratio of crystal surface to added liquid. However, at such proportions the mass becomes stiff or plastic and does not flow freely so that it cannot be handled in commercial equipment. Even under the best conditions of the prior art processes, particles which have been ground will have sharp corners and be angular in shape and have dust electrostatically attached. This dust is especially undesirable because it detracts from the appearance of the crystals and is readily detached and dispersed in the air to the annoyance of operators to whom it causes nasal irritation, sneezing, skin irritation by abrasion and by solution in perspiration and, furthermore, it settles on and attacks the lenses of spectacles, etc.

An optical examination of commercial sodium metasilicate pentahydrate now available on the market showed that all such products have been crystallized in large chunks and ground up. The particles are translucent to a large degree and have sharp, irregular edged particles. These particles tend to be flat rather than globular and are associated with fine dust as a result of the grinding. Therefore, they are grayish or yellowish in tone. Products which had been aggregated to some extent were translucent with irregular sharp edged particles and had less dust or fine particles, and in these respects were quite different from the products of the present invention, the products of which are opaque and have a dead-white multifaceted appearance because of the complete crystallization and thick globular character of our particles. Our product is readily distinguished from the products of the prior art by optical comparisons.

While the above processes are simple and now easily carried out because of long experience, they are incapable of producing the type of product now desired by compounders and by the market generally. Manufacturers who make compounded cleaning compositions and who use sodium metasilicate pentahydrate as one of the components of their compounded compositions have had a number of objections to available sodium metasilicate pentahydrate. First of all, the manufacturers want a sodium metasilicate pentahydrate which is white, rather than yellow or gray colored, so that when the pentahydrate particles are mixed in with the other white components in the cleaning compound the entire powdered batch of cleaning material will appear to be of uniform composition and color. The manufacturers also want a product which will not be dusty and which will not raise dust problems. Furthermore, they want a more or less uniformly sized product which can be easily mixed with the other components and which will not easily separate itself from the other components by virtue of size differences. The manufacturers want the product to dissolve to a clear solution; they want a product free of $CO_2$ and $SO_2$ or other soluble impurities. Although these factors may not be readily critical from the standpoint of the utility of the cleaning composition, they are extremely important from the standpoint of consumed acceptance and commercial appeal in the marketplace. Thus compounders regard it as essential to have a flat-white, or dead-white, rounded particle which is dust-free and of very regular particle size. It should have a controlled density and a rapid rate of solution. Such a salable product is considered to have aggregate sizes which fall between 10 mesh and 65 mesh (Tyler screen size) with a minimum of particles not passing 10 mesh and a minimum of particles passing 100 mesh. The minimum may, for example, be 1% at either end. The preferred salable range lies between −20 mesh and +48 mesh.

We have found that our product usually has a tamped bulk density of below about 60 lbs. per cu. ft., a crush resistance of about 1 pound, a void volume greater than about 0.10 cc. per gram, an attrition loss of less than 20%, and a reflectance of incident white light of less than about 60%.

Objects

The primary object of our invention is the production of a commercially desirable crystalline product having dry and noncaking, multifaceted, rounded, dustless, dead-white particles requiring no grinding and a minimum of sizing. Another object is to produce at least 50% of salable product without grinding and to have 50% by weight of the product consist of material added as the liquor phase.

Another object is to avoid the necessity of transmitting heat through a large mass of crystals and through the walls of the mold or container itself.

Another object is to provide a commercially feasible processs for the most rapid crystallization of salts using a high ratio of seed crystal surface area to added liquor, avoiding difficulties with high viscosity and plasticity.

Another object is to provide for rapid and complete crystallization by the evaporation of excess water from the added liquor to remove the heat of crystallization.

THE INVENTION BROADLY

We have solved the problem of rapid, complete crystallization by discovering a method of removing the heat of crystallization from a composition with a high ratio of seed surface to liquid metasilicate solution without extreme agglomeration or difficult handling problems. In this process we coat the hydrated seed particles having a particle size less than 48 mesh separately with a liquid silicate solution containing more water than that equivalent to the hydrated seed particles. The evaporation of the excess water provides the means of removal of the heat of crystallization and permits the maintenance of the particles in the proper temperature range for rapid and complete crystallization. Previously, in agglomeration processes it has been thought desirable to have no more than about 10 to 25% of liquid present in order to prevent the increase in temperature brought about by the heat of crystallization and the development of fluid masses with a high viscosity and subsequent incomplete crystallization. The liquid has little or no excess water in order to promote rapid and complete crystallization. In our new process, the heat balance is such that the heat of crystallization of the added liquid is approximately balanced by the evaporation of the excess water added with it. Some degree of further control is provided by varying the temperature of the air, the liquid, and the seed particles as well as the volume of the air and of the liquor and seed.

In its broadest concept the process of the present invention involves:

(a) Introducing a free-flowing mass of fine crystalized sodium metasilicate hydrate seed particles less than 48 mesh at a controlled temperature into the inlet end of an elongated combined coating and crystallization zone;

(b) Spraying an aqueous sodium metasilicate solution on said free-flowing mass of sodium metasilicate during the passage of said mass through said combined coating and crystallization zone, said solution having a gravity of about 35–60° Bé. measured at 93° C. and being introduced at a temperature of about 60–105° C.;

(c) Passing air through said combined coating and crystallization zone countercurrently with respect to said mass, said air being at a temperature between room temperature and the melting point of the aforesaid introduced mass of seed particles and having a water content sufficiently low to permit evaporation from the introduced solution;

(d) Controlling the water content, temperature and amount of said introduced particles, liquid and air so that the introduced aqueous sodium metasilicate solution rapidly crystallizes on said particles to form at least one concentric layer of sodium metasilicate hydrate;

(e) And completing the crystallization of the concentric layer by evaporation of the excess water from said layer to remove the heat of evaporation; and (f) Removing from the outlet end of said zone a solid crystallized sodium metasilicate hydrate product which is at least 50% by weight within the size range of −10+65 mesh without further grinding and which is composed of at least 50% by weight of material derived from the aqueous sodium metasilicate spraying step.

*The introduced mass of sodium metasilicate.* — This mass can also be considered as "seed material" or "seed crystals." Ideally the finely divided seed crystals or mass are introduced at any temperature up to the melting point of the material and for sodium metasilicate five hydrate the optimum temperature is about 43–72° C. Temperatures of the introduced mass near (but below) the melting point usually mean that the aqueous sodium metasilicate can be introduced faster and that a denser product will be produced. The seed crystals are smaller than the desired final product, that is 48 mesh or 65 mesh, and may preferably be less than 100 mesh.

The elongated combined coating and crystallization zone may consist of a rotating tube variously described as a dryer or crystallizer. A finely divided mass of particles can be introduced into one end so as to form a bed of fine particles which are constantly agitated by the rotation of the tube or cylinder.

*Spraying an aqueous sodium metasilicate.*—The liquid is sprayed on the particles at intervals throughout the length of the cylinder.

The amount of liquor introduced depends both upon its concentration and temperature but the upper limit is in all events less than that which will cause a sticky condition in the bed. Observing this limit avoids massive aggregation. The liquor, of course, must have a $Na_2O:SiO_2$ ratio to suit the requirements of the desired final product and a controlled water composition. In general, for the crystallization of sodium metasilicate pentahydrate we have found it best to utilize a gravity of about 35–60° Baumé measured at 93° C. so that the water necessary for the removal of the heat of crystallization will be present. The proper liquor flow may be controlled by the dry bulb temperature of the air leaving the feed end of the crystallizer.

Ideally a thin coating of a crystallizable liquor is placed on the surface of each particle so that more or less rapid crystallization occurs without agglomeration. Actually some aggregation will inevitably occur and even a substantial amount is not objectionable so long as no grinding is required and there is no interference with the operation of the process.

We prefer to use liquor at a temperature of about 60–105° C., at which temperature it has a rather high vapor pressure of water.

To maximize the sojourn time, the liquor should be introduced as near the feed end as possible. The ultimate would thus be to spray all of the liquor at the #1 nozzle. However, from the standpoint of liquor dispersion, product size and proper bulk density, it is desirable to spray at several points. For a commercial unit, it is suggested that 90% of the total liquor be added through three nozzles located within 10 feet of the feed end. A fourth nozzle, located about 20 feet from the feed end, should add about 10% of the total liquor in order to fill the voids in the crystallized particles and thus increase the bulk density.

Continuous knockers are useful at the points of liquor application to keep the shell clean, as the sodium metasilicate pentahydrate when it first sticks to the shell is soft and easily dislodged. If allowed to remain, it will get hard and require the use of a bar and a sledge hammer to break it loose.

*The introduced air.*—The air stream preferably enters the combined coating and crystallization zone at a point adjacent to the product discharge end and flows generally countercurrently to the solid materials. The air stream may have a temperature ranging between room temperature and the melting point of the introduced seed material. The air stream must be sufficient to remove the water which is evaporated from the aqueous liquid which is sprayed on the bed of particles. The entering air must also have a water content sufficiently low to permit evaporation from the concentrated liquor.

Thus the humidity in the incoming air is important because as the humidity of the air changes the volume of air needs to be changed and this makes adjustment very difficult. Also the material at the discharge end has to be at room temperature (or below about 40° C.) for storage purposes in order to avoid caking in storage and, therefore, the entering air must be dry enough to take up the final water and must not add water to the product. In general, preheating the air is not helpful since a high rate of evaporation and rapid cooling of the solution is not particularly desirable. It has been found practical to use carefully conditioned air in this process for the preparation of hydrated metasilicates. In the manufacture of these pentahydrates, for instance, the maximum water content in the air at the seed inlet should be about that of the vapor pressure of a five hydrate solution having the composition of the sodium metasilicate pentahydrate at 20 or 30° C. (v.p.=10 mm. Hg).

*Controlling the water content, temperature and amount of said introduced particles, liquid and air.*—The object of this invention is to form a mass of free flowing particles without forming a fluid mixture. Fluid mixtures lead to subsequent over-aggregation and this in turn results in the development of large balls and rings on the sides of the equipment and other stoppages in the proper flow of the process.

Heat transfer and moisture transfer occur directly between the gas phase and the coating of liquor on the particles and not as in the ordinary processes by transfer through the walls of the container and/or a large mass of crystallizing material.

Much of the heat of crystallization of the liquor is taken up by the evaporation of the water from the surfaces of the particles.

*The product.*—It is the aim of this invention to produce about 50% by weight of a salable product without further crushing or grinding having aggregate sizes which fall between 10 mesh and 65 mesh. That portion of the product which is salable is essentially dead-white, dust-free and globular and will have a mole ratio of below 0.99 $Na_2O:1.00SiO_2$:below $4.99H_2O$. The mole ration $SiO_2$:$Na_2O$ preferably will be between 1:0.99 and 1:0.96 and the ratio $SiO_2:H_2O$ will be between about 1:4.99 and 1:4.70. The tamped bulk density will be less than 60 lbs. per cubic foot and preferably between about 50 and 56. The crush resistance about 1 pound and preferably between about 0.75 and 1.25 pounds. The void volume is greater than about 0.10 cc. per gram and preferably above about 0.12. The attrition loss will be less than 20% and preferably below 15%; and the reflection of incident white light will be below 60% and preferably below 55%, and with a low tendency to cake.

The remainder of the product is usually pulverized to a very finely divided state and is ready for use as a recycle feed material.

When only one or two coatings are applied to a particle passing through the combined coating and crystallization zone, 50% by weight of the final product can be attributed to the liquid which has been added. Increasing the number of coating steps can increase the percentage of the final product which is attributable to the added liquid, but aggregation is to be avoided.

EXAMPLES IN GENERAL

The following examples are illustrative of preferred embodiments of the present invention. It should be understood that these examples are not intended to limit the invention and that obvious changes may be made by those skilled in the art without changing the essential characteristics and the basic concept of the invention. The parts and percentages are by weight, the temperature is room temperature and the pressure is atmospheric, unless otherwise indicated. The mesh and mesh sizes mentioned hereafter refer to Tyler standard screen-scale sieves.

While these products are characterized as dead-white it is impossible to duplicate this visual reaction by optical measurement. Gloss, angle of illumination, illumination, texture, relative opacity, surface uniformity, and color, all affect the appearance of an object. It is virtually impossible to match a flat and a textured surface. The best approximation we have found is the relative reflection of incident white light.

EXAMPLE 1

The product of the present invention may be prepared commercially in a plant such as that illustrated partly in cross section in FIGURE 1. In this continuous type of production unit, fines of sodium metasilicate pentahydrate were introduced by means of a screw feeder 10 into the left end of a rotary crystallizer 12 (3.2 feet in diameter and 40.7 feet long) set at a slope of ⅜ inch per foot and rotating at about 7 r.p.m. by virtue of gear arrangement 12a and 12b. FIGURE 2 shows how the level of the bed (48) near the inlet end differs from the level of the bed (50) near the outlet end. The fines used as feed had the following properties:

| | |
|---|---|
| Total Na$_2$O _____ percent__ | 29.12 |
| Silicate Na$_2$O _____ do____ | 28.89 |
| SiO$_2$ _____ do____ | 28.89 |
| CO$_2$ _____ do____ | 0.16 |
| H$_2$O _____ do____ | 40.47 |
| Insolubles _____ do____ | 0.005 |
| Na$_2$O:SiO$_2$:H$_2$O mole ratio _____ | 0.97:1.00:4.79 |
| Bulk density, tamped _____ lbs./cu. ft__ | 49.2 |

The tank 13 was filled with aqueous sodium metasilicate liquor and this liquor was pumped by means of pump 14 through nine valves which controlled nine lines and spray nozzles leading into spaced points within the interior of the rotary crystallizer 12. The valves have been designated as V1–V9 and the lines and nozzles which these valves control will hereinafter be referred to by the same numbers. This liquor had a density of 58–61° Baumé and was sprayed into the interior of the crystallizer at a temperature of about 95–105° C. on the bed of fines through the nozzle controlled by valve #1, using a pressure of 20 p.s.i. and a nozzle orifice diameter of 0.040 inch. The liquor had a mole ratio of 0.99Na$_2$O:1.00SiO$_2$:5.75H$_2$O. In various tests the feed or liquor ratio as the percent of discharge material varied from 38 to 53% with an optimum objective at about 50%.

Air entering at 16 and passing through air conditioner 18, was fed through conduit 20 into the open discharge end of the rotary crystallizer 12. The air passed countercurrent to the flow of the solids and was withdrawn through conduit 22. Fan 24 assists in drawing the air through filter 26, and, if desired, forcing it out through wet separator 28 and vent 30. Fines separated in filter 26 may be sent via line 32 to the feeder bin 11 and screw feeder 10.

As crystallization progressed and the bed moved from left to right, some water was evaporated from the liquor deposited on the fines and the temperature of the bed rose because of the heat of the crystallization.

The maximum bed temperature of about 52° C. occurred at bout the #2 nozzle. Adjacent to nozzles #4 and #9, the bed temperature decreased to about 42° C. and at the product discharge end the temperature was about 35° C.

In this test the following operating conditions obtained:

| | |
|---|---|
| Dry feed rate, lbs./hr. _____ | 525 |
| Liquor rate, lbs./hr. _____ | 345 |
| Total discharge, lbs./hr. _____ | 870 |
| Liquor ratio (percent of discharge) _____ | 39.7 |
| Loading of crystallizer, lbs. _____ | 3000 |
| Sojourn time, hrs. _____ | 3.45 |
| Speed of rotation, r.p.m. _____ | 5 |
| Air flow, c.f.m. (at 38° C.) _____ | 400 |
| Air at feed end of crystallizer, dry bulb, ° C. _____ | 45 |
| Air at feed end of crystallizer, wet bulb, ° C. ____ | 35 |

The product from the rotary crystallizer may be discharged by means of screw conveyor 43 upon an inclined screen 45. Bin 47 may be stationed to collect the very fine portion of the product. Bin 49 may be stationed to receive the desired size fraction of the product. Bin 51 may be stationed to receive the oversized portion of the product. The material from bin 47 can be recycled to feeder 11 and the material from bin 51 can be ground and likewise recycled.

The discharge from the conveyor 43 was 61% by weight in the −10M+65M salable range while 22% was in the preferred −20M+48M range.

The product in the −20M+48M range was found to be free-flowing, irregular in shape, but crystalline and multifaceted with rounded edges and corners. It was an excellent dead-white color and free of dust. The void volume, determined with an Aminco-Winslow Porosimeter, was 0.12 cc. per gram and resulted in an absorption of white oil of 2.4 grams per cu. centimeter and the absorption of a nonionic surfactant agent of 4.4 grams per cu. centimeter. The crush resistance was found to be 1 pound, and only 54% of the incident white light was reflected. Also, only 14% of −80 mesh material was lost in the attrition test. In this test, a sample of 30 grams of the product was agitated with a current of air at 12 p.s.i.g. for 105 minutes and the amount of material which was fine enough to be blown through an 80 mesh screen was measured. Five grams agitated in 100 cc. of water at 70° F. dissolved in 40 seconds.

The product in the −20+48 mesh range had the following composition:

| | |
|---|---|
| Total Na$_2$O _____ percent__ | 29.19 |
| Silicate Na$_2$O _____ do____ | 28.75 |
| SiO$_2$ _____ do____ | 28.86 |
| Co$_2$ 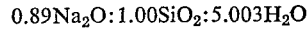 _____ do____ | 0.31 |
| H$_2$O _____ do____ | 41.31 |
| Insolubles _____ do____ | 0.003 |
| Mole ratio Na$_2$O:SiO$_2$:H$_2$O _____ | 0.966:1.00:4.77 |
| Bulk Density, tamped. lb./cu. ft. _____ | 53.8 |

Capacity of the crystallizer is a function of loading, sojourn time, liquor ratio, temperature, air flow, etc. By changing the height of the retaining flights 38 at the discharge end (see FIGURE 2, which is a view along 2—2 of FIGURE 1), the crystallizer could have operated at 5000 lbs. loading, instead of 3000, thus increasing the capacity for the same sojourn time. At a crystallizer loading of 5000 lbs., and with a product sizing of −20+48 mesh, it is conservatively estimated that the dry feed rate, using room temperature fines might be 930 lbs. per hour with a liquor feed rate of 500 lbs. per hour and a total discharge of 1430 lbs. per hour.

EXAMPLE 2

In another run 750 lbs. per hour of fine sodium metasilicate pentahydrate having a mole ratio of $$0.89Na_2O:1.00SiO_2:5.003H_2O$$

and a screen sizing of 39.7% +100 mesh, 27.8% −100+200 mesh, 12.4% −100+200 mesh 12.4% −200+325 mesh, and 20.1% −325 mesh was fed into the crystallizer with liquor added at 860 lbs. per hour; that is, a 53% liquor ratio. The bed temperature reached a maximum of about 145° F. (63° C.), the liquor had a gravity of 59–59.5° measured at 95–100° C. and contained 24.46% Na$_2$O with a silicate mole ratio of 0.985Na$_2$O:1.00SiO$_2$. The liquor was added at stations 1, 2, 3, 4 and 5 with an air flow at about 200 c.f.m. at about 55° C. Sufficient air flow was required to carry the evaporated water out of the crystallizer and keep the air below the saturation point.

EXAMPLE 3

In another run the liquor was added at stations 1, 2 and 5, using a dry feed rate of 800 lbs. per hour of the same dry feed mentioned in Example 2. The liquor feed rate was 600 lbs. per hour; thus the liquor ratio was 42.8%. This liquor contained 26.46% Na$_2$O with a silicate mole ratio of 0.978Na$_2$O:1.000SiO$_2$. The liquor gravity measured hot was 59° Bé. and about 97° C. The air flow was 100 c.f.m. with the air temperature at the discharge 73° C. The air temperature at the feed end was 51° C. During this test the bed temperature at station 4 was 49° C. and at station 6 it was 55° C.

The product was an excellent white material with free-flowing rounded or oval shaped particles. 53% was held betwen 10 mesh and 65 mesh screens with 30% held between 10 mesh and 48 mesh screens. Only 2.5% passed the 48 mesh screen. The bulk density tamped was 51.2, and the mole ratio of the product was $$0.983Na_2O:1.000SiO_2:4.987H_2O$$ 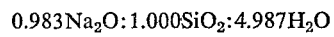

For a short time the liquor rate was increased to 690 lbs. per hour added at stations 1, 2, 3 and 5, thus giving a liquor ratio of 46%. However, mechanical difficulty with the dry feeder made it impossible to complete the test.

EXAMPLE 4

Using the same dry feed as in Example 2 and the liquor of Example 3, a dry feed rate of 570 lbs. per hour with a liquor feed rate of 550 lbs. per hour gave a liquor ratio of 49%. The liquor was fed at 58.5° Bé. hot at a temperature of 93° C. The air flow was 400 c.f.m. with the air temperature at the discharge about 70° C. and at the feed end about 52° C. The bed temperature at position #2 was about 58° C., at position #4 it was 56° C. and at position #9 it was 53° C. The liquor was fed at nozzles #1, 2 and 3, and the product had a mole ratio of $0.975Na_2O:1.00SiO_2:4.920H_2O$ with 56% held on the 10 mesh screen and 43.4 held to between 10 mesh and 48 mesh. Only 0.6% passed the 48 mesh screen. The tamped bulk density was 55.6 lbs. per cu. ft. When the product was back-fed as seed material, the bed temperature rose in proportion to the heat introduced by the back feed, and unless the larger particles were removed the final particle size became greater than 10 mesh.

Our product has an increased commercial utility resulting in increased salability compared to previous products. Insoluble matter settles out and makes an unsatisfactory appearance in the dissolved detergent solution. It may also settle out on the treated goods and have a deleterious effect. It may also settle out to the bottom of a dissolver and cause additional work for cleaning the dissolver. Therefore, the purchaser prefers a material with a minimum of insoluble matter.

The proper sizing of the material promotes better blending with other materials of the same size and prevents separation or segregation in later handling. The customer therefore has better control over his processes since the product is always uniform when he uses it.

The dead-white appearance has utility in that it blends with other materials which may be present and not only increases the attractive appearance of the final product as a uniform product but has the advantage to the industrial compounder that it makes it more difficult for a competitor to determine the actual composition of his compounded mixture.

Thus our new product has a more desirable flat or dead-white color. It dissolves more rapidly and uniformly in water. The particles have a more uniform size and globular shape. The product has less dust in a given weight or volume of product, resulting in less nasal irritation during handling, and it has a lower attrition loss as a result of mixing or other handling. For instance, in modern bulk handling the products are blown from place to place by a current of air and thus have attrition losses which may be measured as indicated in our example. A product has a higher purity by reduction in $CO_2$ and $SO_2$, etc. There is less size separation during handling and shipping. Only a simple screening step is required to obtain a product within a narrow size range. The particles also have a lesser tendency to cake or lump than did prior art products. The insoluble matter per unit weight approaches zero. Our product is readily mixable with other cleaning chemicals to produce uniformly sized cleaning compositions and it absorbs relatively large amounts of detergents and oils which may be required by the compounder.

Although this invention has been particularly described with reference to sodium metasilicate hydrates, it will be appreciated that the invention is equally applicable to other alkali metal metasilicate hydrates as well as hydrated sesquisilicates.

More or less specific claims will be presented hereinafter and even though such claims are rather specific in nature, those skilled in the art to which this invention pertains will recognize that there are obvious equivalents for the specific materials recited therein. Some of these obvious equivalents are disclosed herein, other obvious equivalents could be readily ascertained upon rather simple, routine, non-inventive experimentation. Certainly no invention would be involved in substituting one or more of such obvious equivalents for the materials specifically recited in the claims. We intended that all such obvious equivalents be encompassed within the scope of this invention and patent grant in accordance with the well known doctrine of equivalents, as well as changed proportions of the ingredients which do not render the composition unsuitable for the disclosed purposes.

What we claim is:
1. A process which comprises:
   (a) continuously introducing a free-flowing mass of fine crystallized sodium metasilicate pentahydrate seed particles largely within the size range of 100–200 mesh at a temperature of 43–72° C. into the inlet end of an elongated combined coating and crystallization zone, said mass being constantly agitated and slowly moved toward the outlet end of said coating and crystallization zone,
   (b) spraying an aqueous sodium metasilicate solution on said free-flowing mass of sodium metasilicate particles during the passage of said mass through said combined coating and crystallization zone, said solution having a gravity of about 35–60° Baumé measured at 93° C. and being introduced at a temperature of about 60–105° C.,
   (c) passing air through said combined coating and crystallization zone countercurrently with respect to said mass, said air being at a temperature between room temperature and the melting point of the aforesaid introduced mass of seed particles and having a water content sufficiently low to permit evaporation from the said introduced solution,
   (d) controlling the water content, temperature and amount of said introduced particles, liquid and air so that the introduced aqueous sodium metasilicate solution rapidly crystallizes on said particles to form at least one concentric layer of sodium metasilicate hydrate,
   (e) and completing the crystallization of the concentric layer by evaporation of the excess water from said layer to remove the heat of crystallization, and
   (f) removing from the outlet end of said zone a solid crystallized sodium metasilicate pentahydrate product which is at least 50% by weight within the size range of −10+65 mesh without further grinding and which is composed of at least 40% by weight of material derived from the aqueous sodium metasilicate spraying step.
2. A process which comprises:
   (a) introducing a free-flowing mass of sodium metasilicate hydrate particles largely within the size range of 100–200 mesh at a temperature below the melting point of the hydrate, into the inlet end of an elongated combined coating and crystallization zone,
   (b) spraying an aqueous sodium metasilicate solution on said free-flowing mass of sodium metasilicate during the passage of said mass through said combined coating and crystallization zone,
   (c) passing air through said combined coating and crystallization zone countercurrently with respect to said mass,
   (d) controlling the water content, temperature and amount of said introduced particles, liquid and air so that the introduced aqueous sodium metasilicate solution rapidly crystallizes on said particles to form at least one concentric layer of sodium metasilicate hydrate,
   (e) removing a solid sodium metasilicate hydrate product which is at least 50% by weight within the range of −10+45 mesh without further grinding and which is composed of at least 40% by weight of material derived from the aqueous sodium metasilicate spraying step.

3. As a new article of commerce, a mass of discrete sodium metasilicate pentahydrate particles, each of said particles being:
  (a) rounded in shape,
  (b) a completely crystallized and multifaceted mass composed of a multiple number of very fine crystals,
  (c) of an opaque, dead-white color, and
  (d) having a crush resistance ranging between 0.75 and 1.25 pounds.
the overall mass:
  (e) having at least 50% by weight in the size range between 10 and 65 mesh,
  (f) being free from association with sharp angular dust particles,
  (g) being dry and non-caking,
  (h) having a void volume of greater than 0.10 cc. per gram,
  (i) having an attrition loss less than 20%,
  (j) having a reflection of incident white light below 60%, and
  (k) a bulk density of less than 60 lbs. per cu. ft.

4. As a new article of commerce, a mass of discrete sodium metasilicate pentahydrate particles, each of said particles:
  (a) being rounded in shape,
  (b) being a completely crystallized and multifaceted mass composed of a multiple number of very fine crystals,
  (c) being of an opaque, dead-white color,
  (d) having a crush resistance ranging between 0.75 and 1.25 pounds,
  (e) having an $SiO_2:Na_2O$ ratio between 1:0.99 and 1:0.96, and
  (f) having an $SiO_2:H_2O$ ratio between about 1:4.99 and 1:4.70,
the overall mass:
  (g) having at least 50% by weight in the size range between 10 and 65 mesh,
  (h) being free from association with sharp angular dust particles,
  (i) being dry and non-caking,
  (j) having a void volume of greater than 0.10 cc. per gram,
  (k) having an attrition loss less than 20%,
  (l) having a reflection of incident white light below 60%, and
  (m) a bulk density of less than 60 lbs. per cu. ft.

References Cited

UNITED STATES PATENTS 2,017,561   10/1935   Baker _____ 23—110

EDWARD J. MEROS, *Primary Examiner.*